United States Patent
Foley et al.

(10) Patent No.: US 12,453,550 B2
(45) Date of Patent: Oct. 28, 2025

(54) SUTURING DEVICE

(71) Applicant: Durastat LLC, Austin, TX (US)

(72) Inventors: Kevin Foley, Germantown, TN (US); Adam Azzara, Austin, TX (US); Jens Johnson, Austin, TX (US)

(73) Assignee: DURASTAT LLC, Austin, TX (US)

( * ) Notice: Subject to any disclaimer, the term of this patent is extended or adjusted under 35 U.S.C. 154(b) by 399 days.

(21) Appl. No.: 18/150,875

(22) Filed: Jan. 6, 2023

(65) Prior Publication Data

US 2024/0225637 A1  Jul. 11, 2024

(51) Int. Cl.
*A61B 17/04* (2006.01)
*A61B 17/00* (2006.01)
*A61B 17/06* (2006.01)

(52) U.S. Cl.
CPC .... *A61B 17/0491* (2013.01); *A61B 17/06066* (2013.01); *A61B 2017/00367* (2013.01); *A61B 2017/0608* (2013.01); *A61B 2017/061* (2013.01)

(58) Field of Classification Search
CPC ............ A61B 17/0482; A61B 17/0469; A61B 2017/00367; A61B 2017/06014; A61B 2017/047; A61B 2017/0608
See application file for complete search history.

(56) References Cited

U.S. PATENT DOCUMENTS

| | | | |
|---|---|---|---|
| 5,665,096 A * | 9/1997 | Yoon .................... | A61B 17/062 606/139 |
| 6,042,601 A * | 3/2000 | Smith ................ | A61B 17/0057 606/232 |
| 10,610,215 B2 | 4/2020 | Anderson | |
| 10,709,443 B2 | 7/2020 | Anderson | |
| 10,918,379 B2 | 2/2021 | Kurd | |
| 2003/0233108 A1* | 12/2003 | Gellman ............ | A61B 17/0469 606/144 |
| 2019/0021722 A1* | 1/2019 | Anderson ............ | A61B 17/062 |
| 2020/0375588 A1* | 12/2020 | Veenhof ............. | A61B 17/0482 |

* cited by examiner

*Primary Examiner* — Darwin P Erezo
*Assistant Examiner* — Raihan R Khandker
(74) *Attorney, Agent, or Firm* — Rankin, Hill & Clark LLP

(57) ABSTRACT

A suturing device is provided including a cannula, a needle pusher, a plunger, a spring, a shuttle, a button and a tether. The cannula includes a needle compartment defining a needle passage terminating in a distal opening. The needle pusher is provided in the cannula. Movement of the plunger from the extended position toward the depressed position compresses the spring. The spring exerts a biasing force on the shuttle in the advance direction when the plunger is in the depressed position. The button operably engages with the shuttle, and the spring biases the shuttle in the advance direction after the button is depressed, which pushes the needle pusher in the advance direction. The tether connects the plunger with the shuttle.

15 Claims, 7 Drawing Sheets

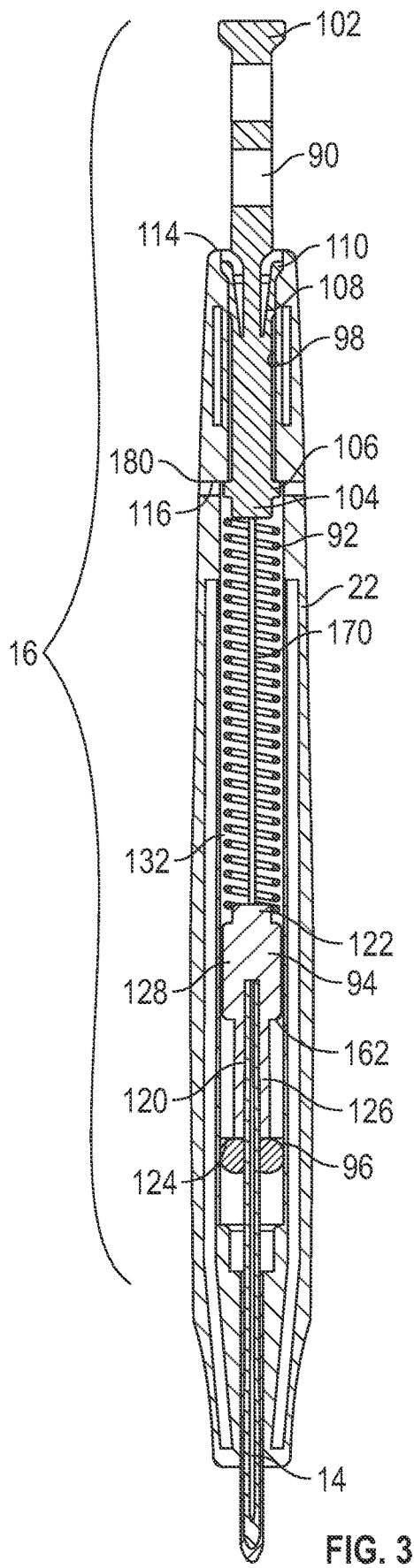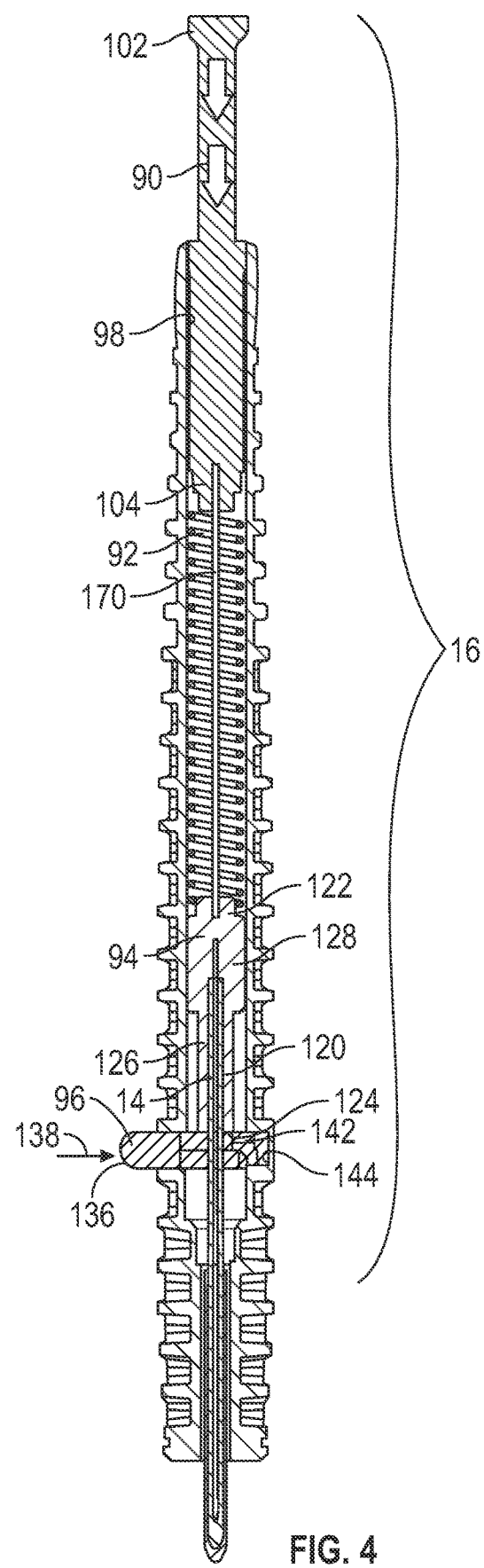
FIG. 3
FIG. 4

SUTURING DEVICE

BACKGROUND

The present disclosure relates generally to surgery and the placement of sutures, and more particularly to devices and methods for suture repair of the tissue.

Surgical closure using sutures is one approach to tissue repair. Oftentimes a needle driver or similar device is used to locate and to pass a suture needle through the tissue to be repaired. The suture needle attaches at one end to a predetermined length of suture, which can be stored in a suture package. Other wound closure devices, such as staples, and other repair devices, like mesh or patch reinforcements, are frequently used for repair.

Locating the tissue repair devices, especially when working in areas where it is difficult for a surgeon to access such as when working through a tubular retractor or other portal, can be very challenging. U.S. Pat. No. 10,610,215 B2 discloses a suturing device that includes an elongate body, a needle holder, and an actuator. The needle holder defines a needle passage that holds a needle. The actuator is configured such that movement from a first operating position toward a second operating position moves the needle in an advance direction. The actuator includes a button and a spring biasing the actuator toward the second operating position. The button is operatively connected with the spring so as to preclude the spring from moving the actuator toward the second operating position until after the button has been moved from a non-actuated position toward an actuated position. The suturing device disclosed in U.S. Pat. No. 10,610,215 B2 is particularly well suited for delivering one needle; however, reloading the device with another needle or the same needle that had been deployed can be problematic.

SUMMARY

In view of the foregoing, a suturing device is provided including a cannula, a needle pusher, a plunger, a spring, a shuttle, a button and a tether. The cannula includes a needle compartment defining a needle passage terminating in a distal opening. The needle pusher is provided in the cannula. Movement of the plunger from the extended position toward the depressed position compresses the spring. The spring exerts a biasing force on the shuttle in the advance direction when the plunger is in the depressed position. The button operably engages with the shuttle, and the spring biases the shuttle in the advance direction after the button is depressed, which pushes the needle pusher in the advance direction. The tether connects the plunger with the shuttle.

BRIEF DESCRIPTION OF THE DRAWINGS

FIG. 3 is a cross-sectional view of a proximal portion of the suturing device depicted in FIG. 1.

FIG. 4 is another cross-sectional view of the proximal portion of the suturing device depicted in FIG. 1 rotated 90 degrees from the view shown in FIG. 3.

DETAILED DESCRIPTION

Figure 1:
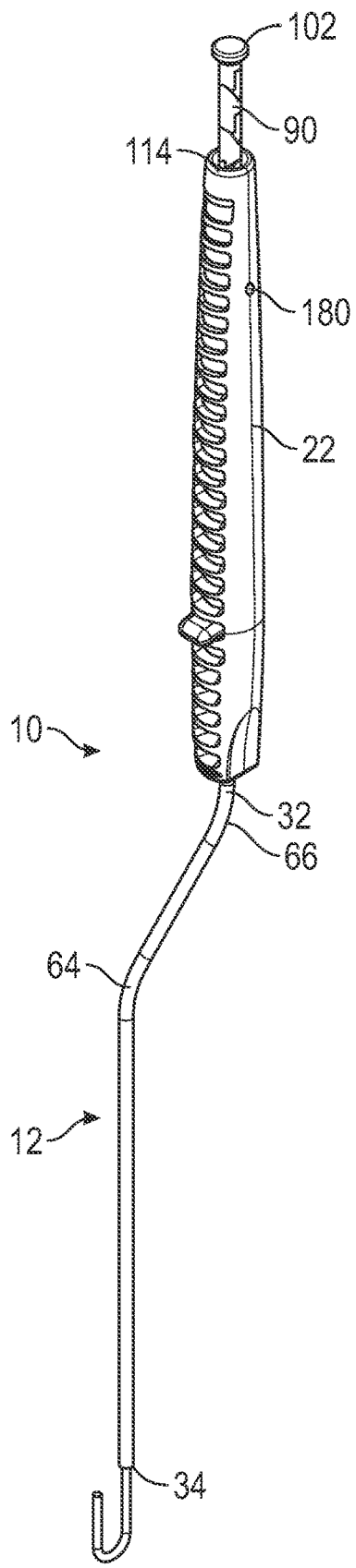
FIG. 1 is a perspective view of a suturing device.
Figure 2:
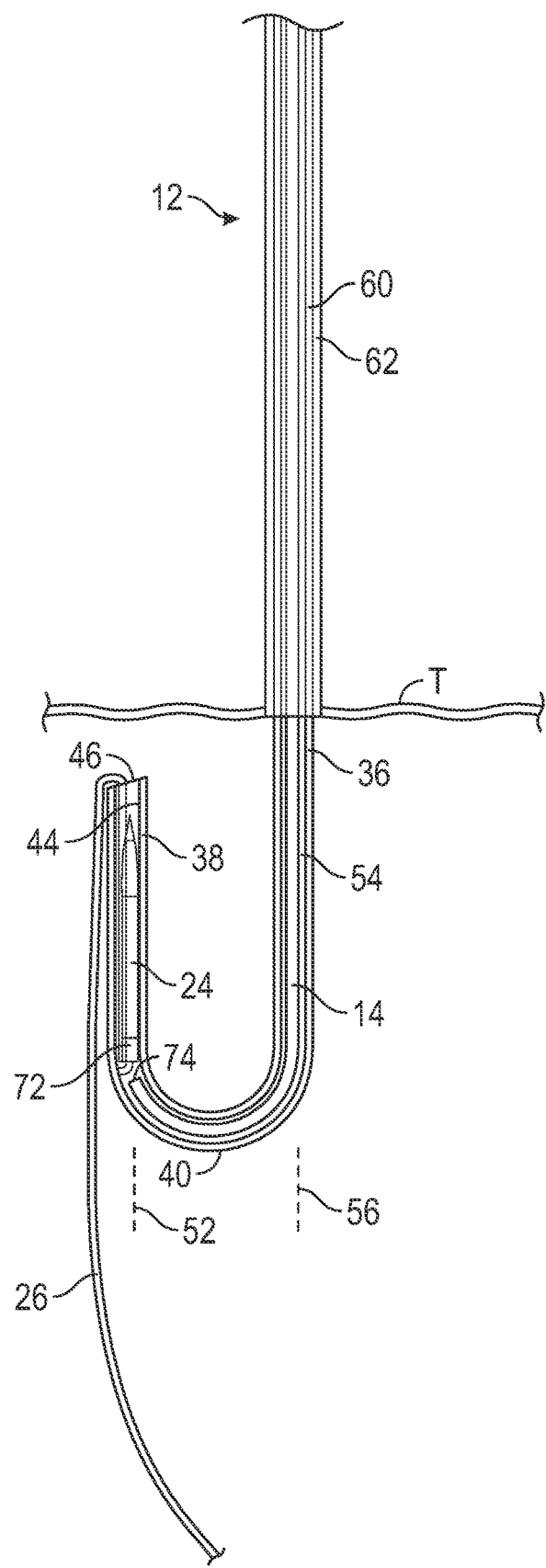
FIG. 2 is a cross-sectional view of the lower portion of the suturing device depicted in FIG. 1 positioned to repair a tissue tear.
Figure 2A:
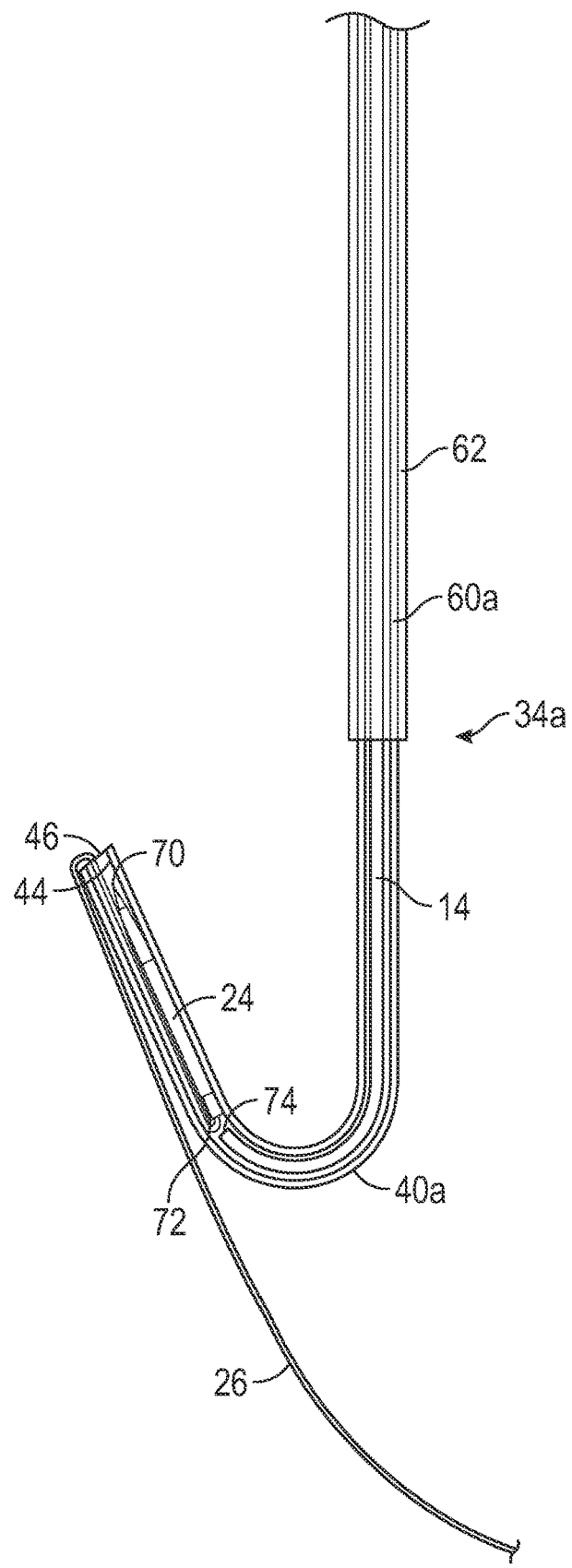
FIG. 2A is a cross-sectional view of the lower portion of the suturing device according to an alternative embodiment.
Figure 2B:
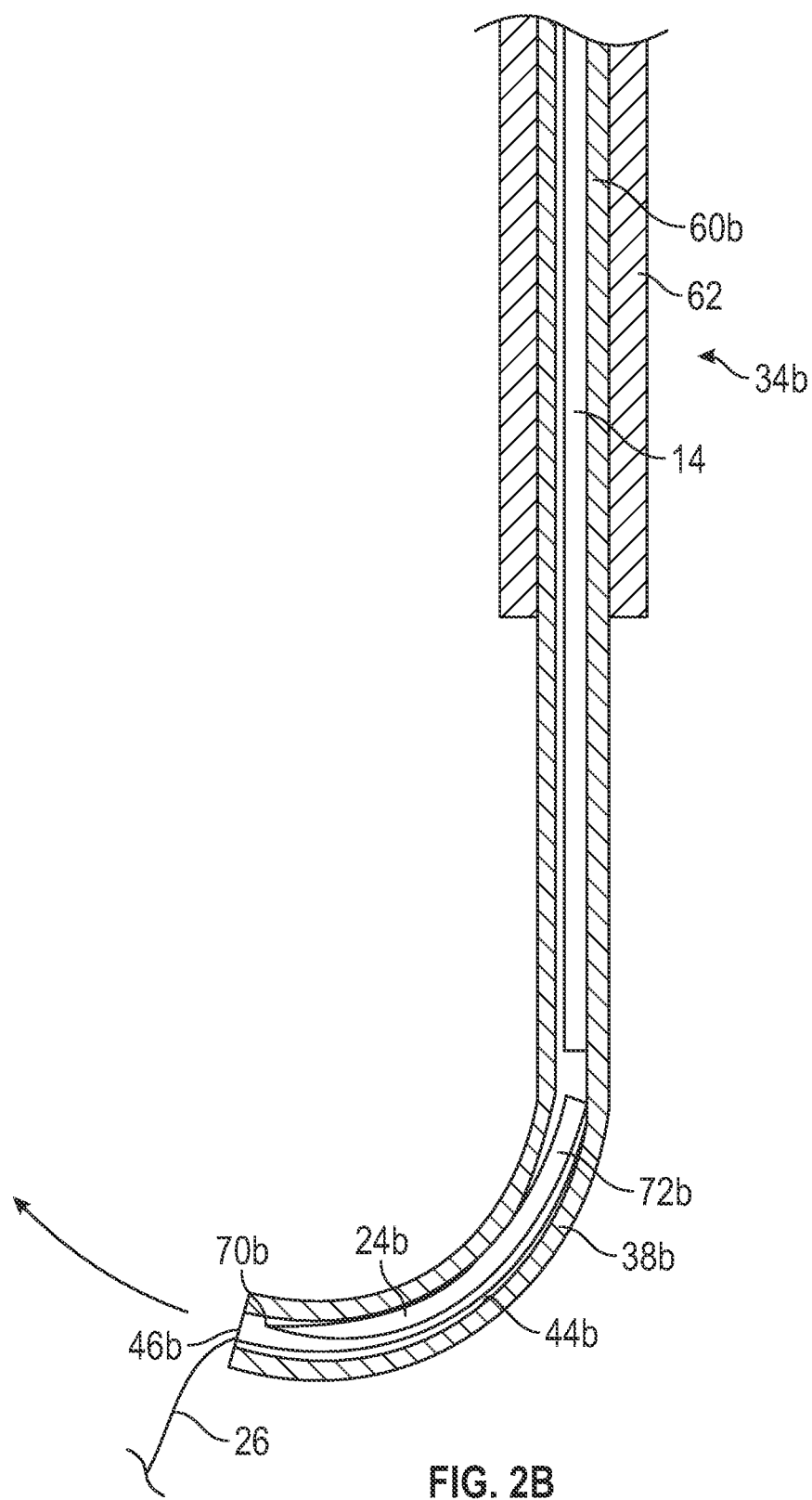
FIG. 2B is a cross-sectional view of the lower portion of the suturing device according to another alternative embodiment.

FIGS. 1-4 depict a suturing device 10 including a cannula 12 (FIG. 1), a needle pusher 14 (FIGS. 2, 2A and 2B) and an actuator mechanism 16 (FIGS. 3 and 4). With reference to FIG. 1, the suturing device 10 can further include a handle 22 connected with the cannula 12. With reference to FIGS. 2 and 2A, the suturing device 10 can further include a needle 24 and a suture 26 connected with the needle 24. FIG. 2B depicts how the needle 24b can take different configurations, e.g., straight as shown in FIGS. 2 and 2A and curved as shown in FIG. 2C. The suturing device 10 is useful to repair tissue tears. The suturing device 10 is particularly useful during a minimally invasive surgical procedure that is performed through a tubular retractor or other small surgical portal to accurately locate the needle 24, 24b and the suture 26 to facilitate passing the needle 24, 24b through target tissue T to be sutured.

With reference to FIG. 1, the cannula 12 includes a proximal portion 32 and a distal portion 34. The proximal portion 32 is located nearer to and/or can be partially received in the handle 22. The distal portion 34 can take different configurations. Two further embodiments of the distal portion 34 similar to the embodiment shown in FIGS. 1 and 2 are illustrated in FIGS. 2A and 2B where like parts have like reference numerals with an additional suffix.

In FIG. 2, the distal portion 34 includes a more proximal section 36, a needle compartment 38 and a curved section 40. The more proximal section 36 is located nearest the proximal portion 32 of the cannula 12. The needle compartment 38 defines a needle passage 44 terminating in a distal opening 46. The curved section 40 is located between the needle compartment 38 and the more proximal section 36. A distal edge surface 48 of the needle compartment 38 defines the distal opening 46. As more clearly seen in FIG. 2, the distal edge surface 48 of the needle compartment 38 slopes upwardly toward the proximal portion 32 of the cannula 12.

The needle passage 44 extends along a linear needle passage axis 52. This aids in accommodating the needle 24, which in FIGS. 2 and 2A is straight instead of curved, in the needle passage 44. As illustrated, the curved section 40 has an arc length of 180 degrees. The more proximal section 36 defines at least a portion of a needle pusher passage 54 in which at least a portion of the needle pusher 14 is received. The portion of the needle pusher passage 54 within the more proximal section 36 extends along a linear proximal section axis 56, which can be offset from and parallel with the linear needle passage axis 52 because of the 180 degree arc length of the curved section 40 for the embodiment shown in FIG. 2. However, in alternative configurations, the curved section 40a (FIG. 2A) can have an arc length between 150 degrees and 210 degrees. For example, in FIG. 2A the arc length of the curved section 40 is less than 180 degrees. Although not depicted, the arc length of the curved section 40 can be greater than 180 degrees.

FIG. 2B depicts the needle compartment 38b being curved. The needle compartment 38b defines a curved needle passage 44b terminating in a distal opening 46b. The needle passage 44b extends along a curved needle passage axis. This aids in accommodating the needle 24b, which in FIG. 2B is curved instead of straight, in the needle passage 44b. As illustrated, the needle compartment 38b has an arc length less 180 degrees, although the arc length could be longer.

As illustrated, the cannula 12 includes an inner cannula 60, 60a, 60b received in an outer cannula 62 where the distal portion 34, 34a, 34b of the cannula 12 is provided on the inner cannula 60. Nevertheless, it is contemplated that the cannula 12 can be made from a single tube or more than two tubes connected with one another. In the depicted embodiments, the cannula 12 is circular in a cross section taken normal to the longest dimension of the cannula 12, however, the cannula 12 could take alternative configurations, such as polygonal or U-shaped. The cannula 12 has a bayonet configuration in the illustrated embodiment; however, the cannula 12 could take alternative configurations, such as straight along a longitudinal axis. As illustrated in FIG. 1, the cannula 12 includes a more distal bend 64 and a more proximal bend 66 to form the bayonet configuration.

With reference to FIGS. 3 and 4, the needle pusher 14 is operably connected with the actuator mechanism 16. The needle pusher 14 can be a wire, which can be made from nitinol. The needle pusher 14 is received in the cannula 12. More particularly, the needle pusher 14 is received in the needle pusher passage 54 located within the cannula 12. Upon actuation of the actuator mechanism 16, which will be described in more detail below, the needle pusher 14 is configured to push the needle 24 in an advance direction through the distal opening 46. In FIGS. 2 and 2A, the needle 24 includes a first end 70, which is pointed, and a second end 72 that is opposite the first end 70. Similarly, in FIG. 2C, the needle 24b includes a first end 70b, which is pointed, and a second end 72b that is opposite the first end 70b. The suture 26 connects with the second end 72, 72b of the needle 24. In the illustrated embodiment, at least a portion of the suture 26 extends through the distal opening 46, 46b when the needle 24 is received in the needle compartment 38, 38b prior to the actuator mechanism 16 being actuated.

Prior to actuation of the actuator mechanism 16, a distal end 74 of the needle pusher 14 is offset from the second end 72 of the needle 24. In FIGS. 2 and 2A, the needle pusher passage 54 extends into the curved section 40 of the distal portion 34 of the cannula 12, and prior to actuation of the actuator mechanism 16 a portion of the needle pusher 14 extends into the curved section 40 of the distal portion 34 of the cannula 12. The needle pusher passage 54 also extends through the more distal bend 64 and the more proximal bend 66 in the cannula 12 located in the proximal portion 32 of the cannula 12.

With reference to FIGS. 3 and 4, the actuator mechanism 16 is operably connected with the needle pusher 14. The actuator mechanism 16 includes a plunger 90, a spring 92, a shuttle 94, and a button 96. The plunger 90 is movable between an extended position and a depressed position. When the button 96 is not depressed, which is the position shown in FIG. 4, movement of the plunger 90 from the extended position toward the depressed position compresses the spring 92 against the shuttle 94. The spring 92 exerts a biasing force on the shuttle 94 in the advance direction when the plunger 90 is in the depressed position. The button 96 is operably engaged with the shuttle 94. The spring 92 biases the shuttle 94 in the advance direction after the button 96 is depressed, which moves the needle pusher 14 and pushes the needle 24 in the advance direction.

The plunger 90 is received in an upper bore 98 provided in the handle 22. The plunger 90 includes a proximal head 102 and a distal end portion 104. A radial shoulder 106 is offset from the distal end portion 104 toward the proximal head 102. The distal end portion 104 and the radial shoulder 106 operate as a locating feature for the spring 92. The plunger 90 further includes a resilient finger 108 (two resilient fingers are shown in FIG. 3). A barb 110 is provided at an end of each resilient finger 108. As mentioned above, the plunger 90 is movable between and extended position, which is shown in FIG. 3, and a depressed position where the proximal head 102 is brought closer to and can come in contact with proximal end 114 of the handle 22. A thumb of the operator of the suturing device 10 can be used to depress the plunger 90 moving the plunger 90 from the extended position toward the depressed position. A shoulder 116 can be provided in the handle 22 and the radial shoulder 106 contacts the shoulder 116 in the handle 22 when the plunger 90 is in the extended position. As the plunger 90 is depressed, the resilient fingers 108 compress while traveling through the upper bore 98 until passing the shoulder 116 in the handle 22 in the depressed position. When in the depressed position, the resilient finger 108, and more particularly the barb 110 on the resilient finger 108, selectively engages the shoulder 116 in the handle 22 to maintain the plunger 90 in the depressed position The shuttle 94 includes a bore 120, which receives the needle pusher 14 to connect the needle pusher 14 with the shuttle 94. The needle pusher 14 is fixed to the shuttle 94 such that movement of the shuttle 94 results in movement of the needle pusher 14. The shuttle 94 includes a proximal end portion 122 that provides a locating feature for the spring 92. The shuttle 94 also includes a button contact surface 124, which is a distal end surface of the shuttle 94 as illustrated in FIGS. 3 and 4. The shuttle 94 also includes a reduced cross-sectional portion 126 extending from a relatively larger cross-sectional portion 128. The relatively larger cross-sectional portion 128 has a diameter slightly smaller than an inner diameter of an actuator cavity 132 provided in the handle to allow for translational movement of the shuttle 94 within the actuator cavity 132.

The button 96 includes an operator contact surface 136 and operates as a push button in the illustrated embodiment whereby an operator, such as a surgeon, depresses the button 96 in the direction of arrow 138 moving the button 96 from the non-actuated position toward the actuated position. The button 96 also includes a finger 142 (see also FIG. 5) which contacts an inner side surface 144 provided in the handle 22 to bias the button 96 toward the non-actuated position. As the operator depresses the button 96 in the direction of arrow 138, the finger 142 bends and operates similar to a spring.

Figure 5:
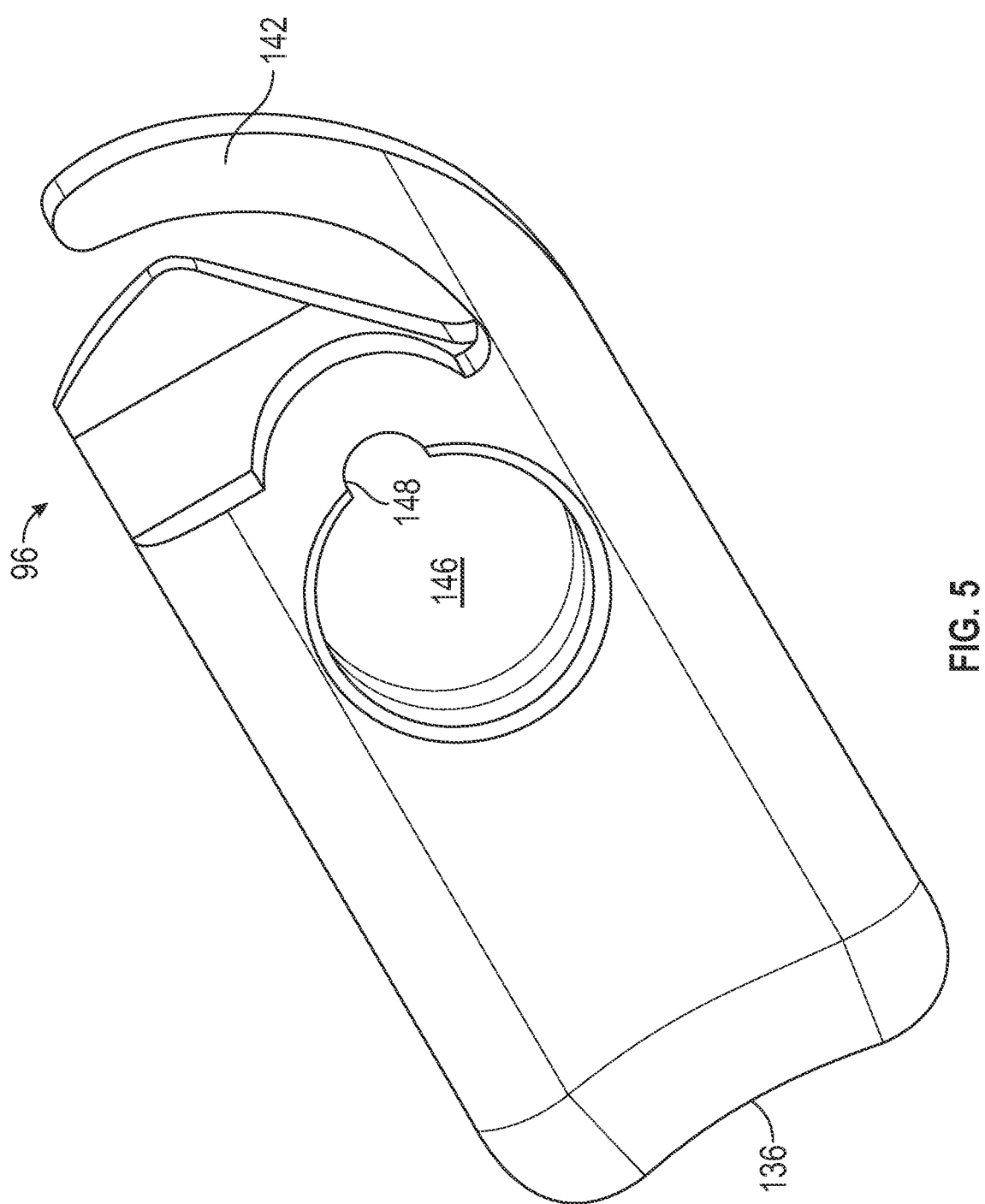
FIG. 5 is a perspective view of a button of the suturing device of FIG. 1.

As more clearly seen in FIG. 5, the button 96 includes an opening made up of a main portion 146 and a smaller portion 148. The main portion 146 of the opening is configured to receive the reduced cross-sectional portion 126 of the shuttle 94 when the main portion 146 of the opening is aligned with the reduced cross-sectional portion 126. This occurs when the operator presses the operator contact surface 136 in the direction of arrow 138 thus moving the button 96 to the right per the orientation shown in FIG. 4. The main portion 146 of the opening, however, is smaller than the relatively larger cross-sectional portion 128 of the shuttle 94. Accordingly, the travel distance of the shuttle 94 is limited by the distance between the button contact surface 124 and a shoulder 162 where the reduced cross-sectional portion 126 transitions to the relatively larger cross-sectional portion 128. With reference back to FIG. 5, the smaller portion 148 of the slider opening is configured to allow for passage of the needle pusher 14 to allow for the connection of the needle pusher 14 to the shuttle 94. When the button 96 is in the non-actuated position (shown in FIGS. 1 and 4), the button 96 contacts the shuttle 94 to preclude movement of the shuttle 94 with respect to the button 96. When an operator moves the button 96 in the direction of arrow 138, the button 96 is moved in the direction of arrow 138 which allows the main portion 146 of the slider opening to align with the reduced cross-sectional portion 126 of the shuttle 94, and the spring 92 moves the shuttle 94 downwardly (per the orientation shown in FIG. 4) such that the reduced cross-sectional portion 126 passes through the main portion 146 of the opening thus moving the needle pusher 14 and thus moving the needle 24 in the advance direction toward the distal opening 46.

With reference to FIGS. 3 and 4, a tether 170 connects the plunger 90 with the shuttle 94. Similar to a conventional cable, the tether 170 is configured to sustain a tensile force, but not a compressive force. The tether 170 is useful to pull the shuttle 94, and more particularly the reduced cross-sectional portion 126, back through the main portion 146 of the slider opening after the needle 24 has been deployed, which can be useful if re-loading of the suturing device 10 is desired.

The handle 22 connects with the cannula 12. The spring 92 and the shuttle 94 are positioned inside the handle 22. The plunger 90 and the button 96 are at least partially received in the handle 22. As mentioned above, the plunger 90 includes the resilient finger 108 which selectively engages the shoulder 116 in the handle 22 to maintain the plunger 90 in the depressed position. With reference to FIG. 3, the handle 22 includes an opening 180 aligned with the shoulder 116 in the handle 22 through which the resilient finger 108, and more particularly the barb 110, is accessible when the plunger 90 is in the depressed position. A small tool can be inserted into the opening 180 in the handle 22 to push the barb 110 away from contacting the shoulder 116 to allow the plunger 90 to be pulled outwardly from the handle 22 toward the extended position from the depressed position. With the tether 170 connecting the plunger 90 with the shuttle 94, movement of the plunger 90 from the depressed position toward the extended position pulls the shuttle 94, and more particularly the reduced cross-sectional portion 126, back through the main portion 146 of the slider opening, which pulls the needle pusher 14 away from the distal opening 46, 46b. After the reduced cross-sectional portion 126 is pulled back through the main portion 146 of the slider opening, the finger 142 on the button 96 biases the button in a direction opposite to the arrow 138, which results in the button contact surface 124 on the shuttle 94 contacting the button 96 and the button 96 returning to an undepressed position.

Figure 6:
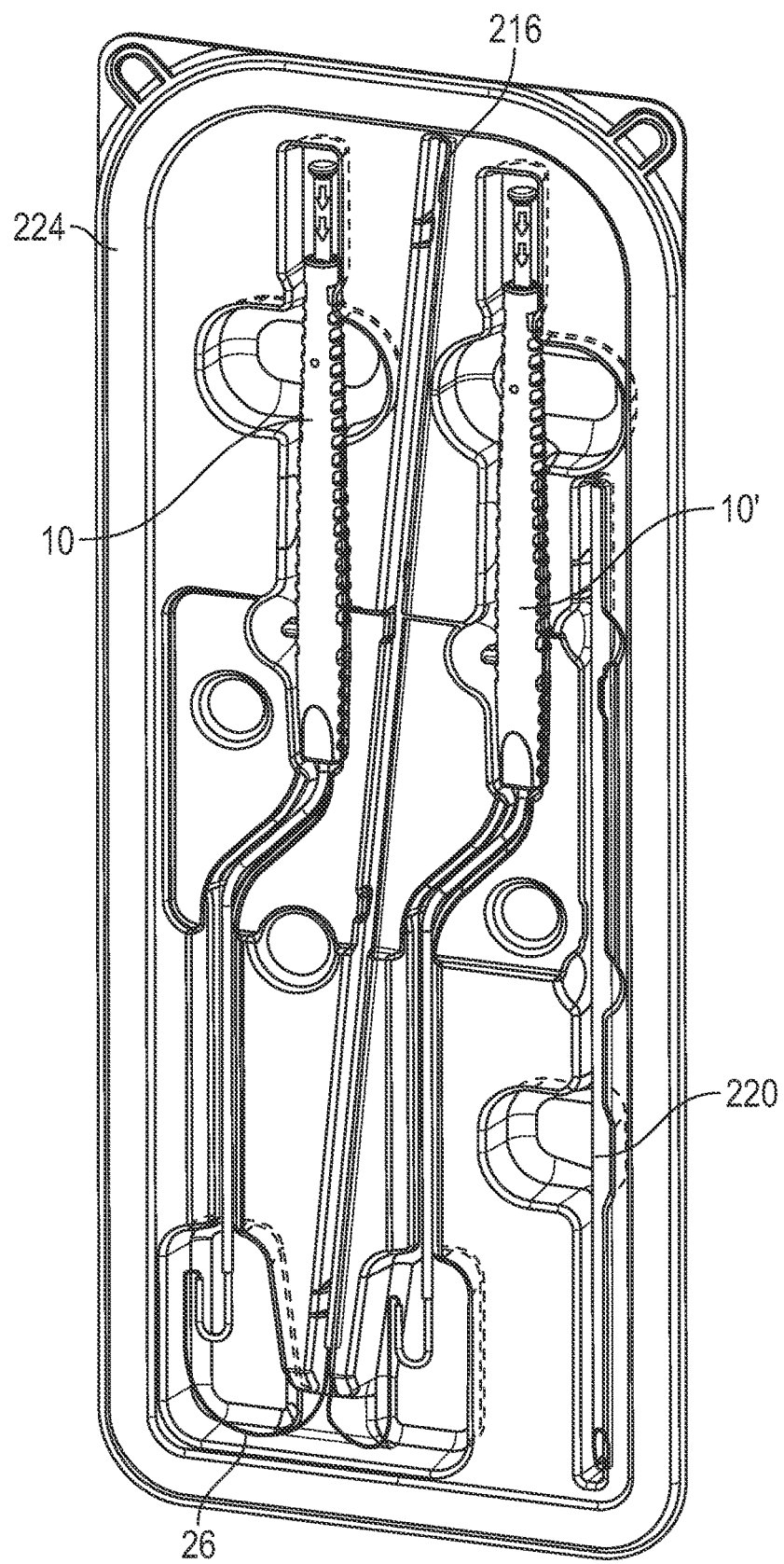
FIG. 6 is a perspective view of a kit including two suturing devices similar to those shown in FIG. 1.

With reference to FIG. 6, a suturing kit 210 includes two suturing devices 10, 10', which can be identical in configuration, a suture holder 216, the suture 26, and a knot pusher 220. The suturing devices 10, 10', the suture holder 216, the suture 26, and the knot pusher 220 are received in a package including a package base 224 and are covered by a cover sheet (not shown) similar to a known cover sheet for packaging sterile surgical instruments. The suture 26 depicted in FIG. 6 is a double-armed suture having one needle 24 (see FIG. 2) disposed in the suturing device 10 and another similar needle (not visible) at the other end disposed in the suturing device 10'. The suture 26 is doubled over within the suture holder 216 in a similar manner to that described in U.S. Pat. No. 10,835,236 B2. The suture holder 216 is positioned between the suturing devices 10, 10' when placed in the package base 224. This inhibits tangling of the suture 26 when the suturing devices 10, 10' are removed from the package base 224.

A suturing device and kit have been described above with particularity. Modifications and alterations will occur to those upon reading and understanding the above detailed description. The invention, however, is not limited to only the embodiments described above. Instead, the invention is broadly defined by the appended claims and the equivalents thereof.

The invention claimed is:

1. A suturing device comprising:
   a cannula including a needle compartment defining a needle passage terminating in a distal opening;
   a needle pusher provided in the cannula;
   a plunger movable between an extended position and a depressed position;
   a spring, wherein movement of the plunger from the extended position toward the depressed position compresses the spring;
   a shuttle, wherein the spring exerts a biasing force on the shuttle in an advance direction when the plunger is in the depressed position;
   a button operably engaged with the shuttle, wherein the spring biases the shuttle in the advance direction after the button is depressed, which pushes the needle pusher in the advance direction; and
   a tether, which is a cable configured to sustain a tensile force, but not a compressive force, connecting the plunger with the shuttle in a manner such the tether pulls the shuttle away from the distal opening when the plunger is moved from the depressed position toward the extended position.

2. The suturing device of claim 1, further comprising a handle connected with the cannula, wherein the spring and the shuttle are positioned inside the handle.

3. The suturing device of claim 2, wherein the plunger includes a resilient finger for selectively engaging a shoulder in the handle when in the depressed position to maintain the plunger in the depressed position.

4. The suturing device of claim 3, wherein the handle includes an opening aligned with the shoulder in the handle through which the resilient finger is accessible when the plunger is in the depressed position.

5. The suturing device of claim 1, wherein the needle compartment and the needle passage are curved.

6. The suturing device of claim 5, further comprising a needle positioned in the needle passage, wherein the needle includes a first end, which is pointed, and a second end, and further comprising a suture connected with the second end of the needle, wherein at least a portion of the suture extends through the distal opening when the needle is received in the needle compartment prior to the button being actuated.

7. The suturing device of claim 1, wherein the cannula includes a proximal portion and a distal portion, the distal portion including a more proximal section, the needle compartment and a curved section, the more proximal section being located nearest the proximal portion of the cannula, and the curved section located between the needle compartment and the more proximal section.

8. The suturing device of claim 7, further comprising a needle positioned in the needle passage, wherein the needle pusher is configured to operate through the curved section to push the needle in the advance direction through the distal opening.

9. The suturing device of claim 8, wherein the needle passage extends along a linear needle passage axis.

10. The suturing device of claim 9, wherein the more proximal section defines at least a portion of a needle pusher passage in which at least a portion of the needle pusher is received, wherein the portion of the needle pusher passage within the more proximal section extends along a linear proximal section axis, which is offset from and parallel with the linear needle passage axis.

11. The suturing device of claim 10, wherein the needle pusher passage extends into the curved section.

12. The suturing device of claim 11, wherein the needle pusher passage extends through a bend in the cannula located proximal to the curved section.

13. The suturing device of claim 11, wherein the needle includes a first end, which is pointed, and a second end, and further comprising a suture connected with the second end of the needle, wherein at least a portion of the suture extends through the distal opening when the needle is received in the needle compartment prior to the button being actuated.

14. The suturing device of claim 1, wherein the button includes a finger that operates as a spring that biases the button in a direction opposite a direction in which the button is depressed.

15. The suturing device of claim 1, wherein the button is configured to return to an undepressed position after the tether pulls the shuttle through an opening in the button.

\* \* \* \* \*